United States Patent [19]

Wiedemann et al.

[11] Patent Number: 4,742,527
[45] Date of Patent: May 3, 1988

[54] LASER HAVING BRAZED ANODE

[75] Inventors: Rudolf A. Wiedemann, Sunnyvale; Michael R. Love, Mountain View; Paul A. Lovoi, Saratoga, all of Calif.

[73] Assignee: Cooper Lasersonics, Santa Clara, Calif.

[21] Appl. No.: 735,560

[22] Filed: May 17, 1985

[51] Int. Cl.⁴ .............................................. H01S 3/097
[52] U.S. Cl. ........................................ 372/87; 372/34; 372/61
[58] Field of Search ....................... 372/65, 87, 61, 33, 372/34, 87, 107

[56] References Cited

U.S. PATENT DOCUMENTS

| | | | |
|---|---|---|---|
| 3,501,714 | 3/1967 | Myers et al. | 372/87 |
| 3,988,698 | 10/1976 | Crane et al. | 372/87 |
| 4,081,762 | 3/1978 | Golser et al. | 372/65 |
| 4,287,484 | 9/1981 | Wano et al. | 372/87 |
| 4,575,853 | 3/1986 | Jako | 372/61 |

Primary Examiner—Léon Scott, Jr.
Attorney, Agent, or Firm—Cushman, Darby & Cushman

[57] ABSTRACT

An ion laser is described having an anode construction which has no special configuration specifically designed to accommodate differential thermal expansion between it and a ceramic tube. The anode includes a radially thick first portion for good thermal conductivity and a thin-walled sleeve integral therewith extending beyond the tube to provide an exterior surface for electrical connection. The radially thick first portion provides desired thermal conductivity in the radial direction while the thin-walled sleeve acts to resist axial thermal conductivity. The anode is brazed to the interior cylindrical surface of a ceramic cylinder providing part of the tube, with a portion of its exterior surface extending beyond the cylindrical portion to be exposed externally for electrical connection. A ceramic end sleeve is brazed within the interior of the thin-walled portion of the anode to structurally support the same.

16 Claims, 2 Drawing Sheets

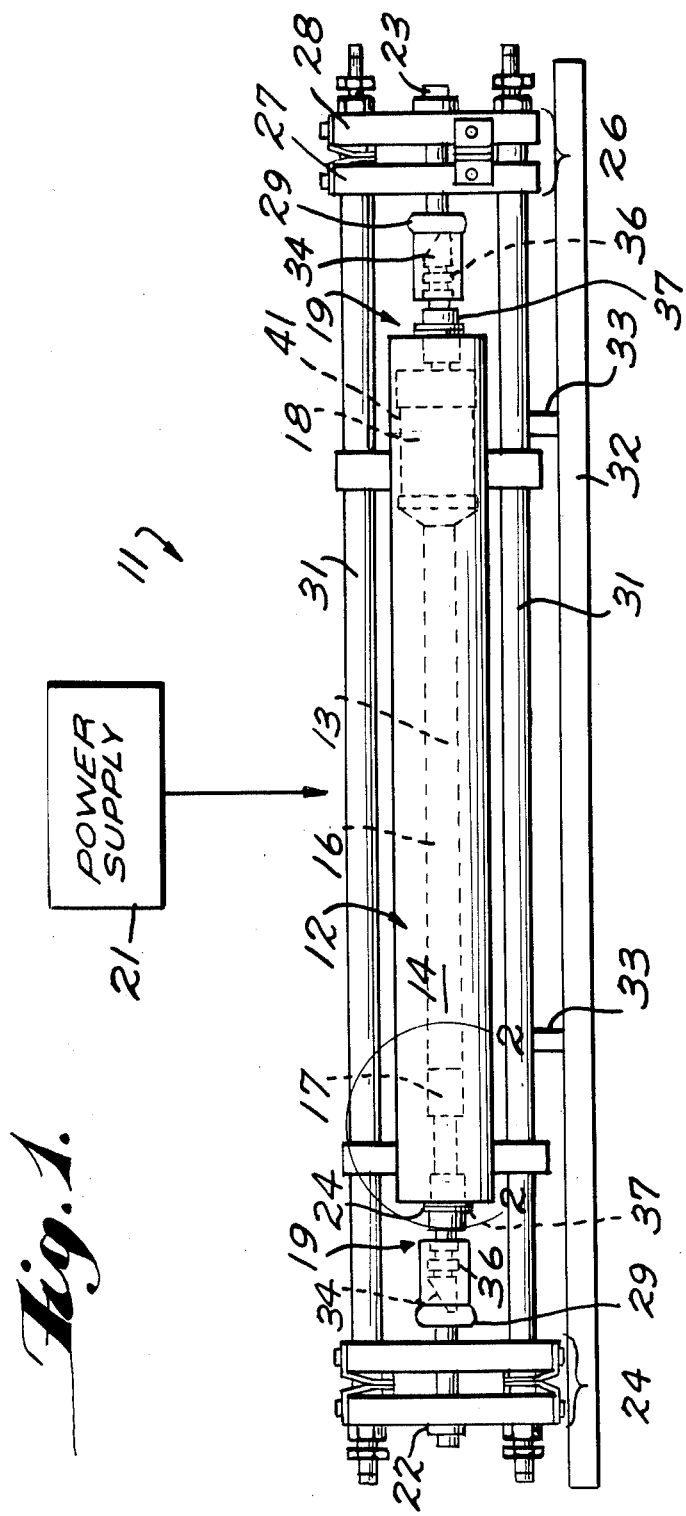

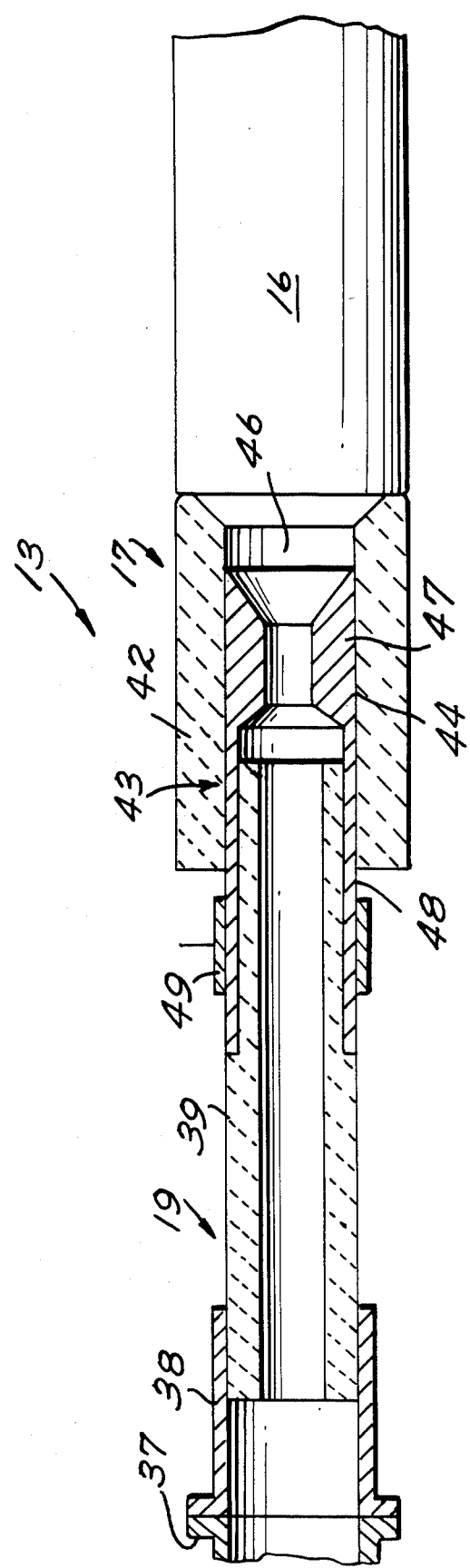

LASER HAVING BRAZED ANODE

BACKGROUND OF THE INVENTION

This invention relates to lasers and, more particularly, to a gas ion laser having an electrically conductive electrode, such as an anode, adhered directly to ceramic of the laser tube. A principle component of a gas ion laser is a laser tube. The laser tube defines a containment volume for a gaseous lasable medium and generally includes window structures at its opposite ends to permit escape from the tube of the optical radiation which results from lasing action. The tube is positioned between a pair of spaced-apart optical reflectors which reflect radiation emitted by the medium back-and-forth through the tube, to cause the stimulated emission of optical radiation from the medium. The space between the reflectors generally is called the "optical cavity" of the laser, and the imaginary line which passes between the reflectors centrally through the tube is called the laser "optical axis".

One of the reflectors usually is partially transmissive to permit optical radiation to escape from the laser optical cavity and thereby form an output beam of coherent radiation. It is necessary that the optical reflectors be maintained in a selected, rigid and spaced-apart relationship to define the optical cavity and assure that lasing action will take place and be maintained. This generally is obtained by mounting the optical reflectors on mounting structures which, in turn, are precisely positioned relative to one another by structure extending therebetween. The mounting structures and the structure extending therebetween typically is referred to as a "resonator" of a laser.

Many medical uses have been found for the coherent radiation output of gas ion lasers. For example, ion laser output is used for macular photocoagulation. Thus, ion lasers are often a dominant part of instruments which now are finding use in hospitals, clinics, the offices of doctors, etc. It will be recognized that in order to assure reliability in these many different environments, it is important that the laser itself be rugged. For this reason, among others such as low dimensional changes due to thermal variations, many manufacturers are making most of the components of an ion laser tube out of a ceramic, such as beryllium oxide or aluminum oxide (alumina). While a ceramic is relatively rugged, it is difficult, if not impossible, to provide feedthrough through the same for the necessary electrical connections internally to an anode or cathode. It therefore often is a practice to include parts of metal or other non-ceramic material adjacent the anode and/or cathode. Moreover, the anode (and cathode) must be electrically conductive and therefore is itself often a metal.

The seal formed between metal and ceramic parts of a laser constitutes one of the structurally weakest areas of a laser tube. Thus, the electrode aspects of a laser tube are generally one of the least rugged and least reliable parts of the same.

SUMMARY OF THE INVENTION

The present invention is a laser and laser tube for the same having an electrode configuration which results in a particularly rugged construction. The electrode is of a metal having high electrical conductivity. It is adhered directly to the ceramic of the tube without special accommodation being provided for differential thermal expansion between such electrode and the ceramic. The configuration of the electrode and of the tube at the electrode location assures that a good direct adherence is achievable with brazing. In this connection, expansion miss-match is accommodated by annealing of the metal, preferably copper, and by the geometrical configuration of the structure. Moreover, this configuration and the construction of the invention enables such direct adherence without the metal of the tube being configured to flex to accommodate differential thermal expansion.

The tube is ceramic adjacent the end at which the electrode is to be located and has a cylindrical interior surface at such location for reception of the electrode. The electrode, in turn, is provided with an outer cylindrical surface to fit within the ceramic end portion. The axial dimension of such outer electrode surface is greater than its radial dimension. Both the interior surface of the ceramic end portion and such exterior surface of the anode are coated with metal layers of a brazing material before the components are assembled together. Upon being raised to a brazing temperature after being assembled together, the anode will expand radially to a greater extent than the ceramic end portion of the tube. The result is that there will be a tight interference fit during the brazing operation. This will assure that a thin braze having a minimum of voids is obtained for good heat transfer and a minimum of braze stresses. The metal of the electrode preferably is annealed to minimize internal stresses. If the electrode is of copper as is preferred, it automatically will be annealed when the construction is raised to the brazing temperature.

When the temperature of the structure is lowered to ambient temperature after the brazing operation, the material of the anode will be placed in tension. (In view of the anode surface's dimensional relationship discussed above, the braze covers a significant surface area and reduces the likelihood of separation between the anode and the ceramic due to the tensile forces which are generated.) When the laser is operated and therefore raised to a temperature higher than ambient, the tension between the ceramic tube and the anode will be relieved to some extent. This relief of internal forces during operation will enhance structural integrity during operation and is in contrast to the accommodations which generally must be made in other ceramic tube - metal anode designs in which care must be taken to assure that the anode, for example, will flex to accommodate the differential thermal expansion expected during lasing operation.

As another salient feature of the invention, the electrode is provided with an electrically conductive surface at both the interior of the tube and at its exterior, and a conductive electrical connection is provided to the exterior surface. The result is that an electrical potential can be provided to the interior of the containment volume without penetration for leads for the electrode. Again, the configuration of the electrode enhances such construction.

The elecrode preferably is an anode that includes a radially thick first portion having a radially thin-walled sleeve extending outwardly beyond the ceramic tube portion mentioned above providing the surface which is exposed to the exterior of the tube to which the conductive electrical connection is made. Most desirably, exterior connection is made by a conductor in the form of a ring or clamp circumscribing and mating with the exteriorly exposed sleeve surface. Supporting structure is provided within the interior of the anode to prevent collapse of the thin-walled sleeve under pressure of the connector clamp. Such support most simply is provided as the ceramic end tubing of a window structure located at the end of the tube having the anode. The exterior surface of the ceramic end tubing of the window structure mates with the interior surface of the sleeve and thereby provides support.

The invention further includes a method of manufacturing the laser tube to enhance the electrode securance. It includes providing the ceramic tube having a cylindrical interior surface at one end, providing an electrode having a cylindrical outer surface whose axial dimension is greater than its radial dimension and thereafter directly adhering the two surfaces together. As mentioned previously, such adherence is preferably obtained by brazing and a greater axial extent of the exterior surface of the electrode than the radial dimension of such electrode, is brazed to provide such direct adherence.

The invention includes other features and advantages which will be described or will become apparent from the following more detailed description.

BRIEF DESCRIPTION OF THE DRAWING

With reference to the drawing, FIG. 1 is a laser incorporating, and made in accordance with, the invention; and FIG. 2 is an enlarged partially sectioned view of the anode electrode construction of the laser of FIG. 1.

DETAILED DESCRIPTION OF THE PREFERRED EMBODIMENT

A preferred embodiment of a gas ion laser incorporating the present invention is illustrated in FIGS. 1 and 2. Laser 11 includes a plasma tube assembly 12. Assembly 12 includes not only the plasma tube 13 itself, but also the magnet assembly and coolant structure required to initiate and maintain efficient lasing operation. These components of the assembly are not illustrated nor will they be described in detail, since they are conventional and do not relate to the inventive aspects. The housing 14 for the same is illustrated, with the plasma tube 13 shown in phantom lines.

The laser plasma tube defines a containment volume for a gaseous lasing medium. Such medium will include quantum resonant particles, such as are present in the ionized noble gases argon and krypton. The gas typically will be at a pressure within the tube of about one torr, and lasing action is sustained by oscillation therethrough of optical radiation of the appropriate frequencies a sufficient number of times to sustain lasing action. (As used herein, the term "optical radiation" is meant to encompass electromagnetic radiation in the visible wavelength spectrum and in other wavelength spectrums, such as in the ultraviolet and infrared range, which follow the laws of optics and quantum mechanics responsible for lasing action.)

Laser plasma tube 13 is made up of the central discharge bore or envelope 16 within which the electrical discharge takes place; anode and cathode structures 17 and 18, respectively; and window structures 19 located at the ends of the remainder of the tube structure. The anode and cathode structures terminate the electrical discharge or in other words, the plasma, and pass the beam of optical radiation. A power supply for initiating and maintaining the electrical discharge in the gaseous lasing medium is represented at 21. Such supply is connected in accordance with conventional practice, to the anode and cathode structures 17 and 18 to maintain the appropriate electrical potential therebetween.

The plasma tube assembly 12 is positioned within the optical cavity of the laser 11, i.e., in the space between reflectors (mirrors) 22 and 23 and the mounting assemblies for the same indicated respectively by the reference numerals 24 and 26. Each of the reflector mounting assemblies 24 and 26 includes a pair of mounting plates 27 and 28 which are maintained in position relative to one another by the structure described in U.S. Pat. No. 3,864,029, the disclosure of which is hereby incorporated by reference. Moreover, each includes a tubular cover and ball joint arrangement 29 of the type described in such patent. The reflector mounting assemblies 24 and 26 are maintained in a selected, rigid and spaced-apart relationship by rods 31 of a material having a low coefficient of thermal expansion over the temperature range to which the rods are expected to be subjected, such as of the metal alloy sold under the trademark IVAR. As illustrated, the assembly is all mounted on a base plate 32 via connector structure 33 (schematically shown) of the type described in U.S. Pat. Nos. 4,201,951 and 4,464,763.

Each of the window structures 19 includes a radiation exit window 34 held at Brewster's angle by an appropriate support 36. Each support 36 is connected via a flange 37 to a short connector 38 (FIG. 2). Connector 38 of the window structure at each end of the tube has, in turn, a cylindrical end tubing 39 terminating either at the anode structure 17 or at the cathode structure 18.

As mentioned previously, many plasma tube assemblies now are made predominantly of a ceramic material. This is particularly true with respect to the discharge tube envelope within which the lasing medium is confined during electrical discharge. (Such an envelope is often referred to in the art as the laser discharge bore.) While one major reason for this is the ability of ceramics to withstand high temperature operation with dimensional stability, another reason is the ruggedness provided by ceramics as opposed to materials used in earlier designs. Consistent with this, tube envelope 16 is made of a ceramic, preferably beryllium oxide (BeO). In accordance with conventional practice, a directly heated cathode is provided within a housing 41 for supplying a source of electrons to initiate and maintain the desired discharge within the bore envelope 16. It will be appreciated that it is necessary to provide electrical and other feedthroughs for operation of such cathode.

As a salient feature of the instant invention, it includes an anode electrode structure which has a configuration eliminating many of the limitations of past designs. The anode itself is of a metal to be a good electrical conductor and yet in keeping with the invention it is secured to the ceramic portion of the tube in a manner which assures good vacuum sealing. With reference to FIG. 2, the anode assembly 17 includes a ceramic cylinder or end cap 42 which is adhered directly to the ceramic bore 16. The cylinder 42 is also preferably of BeO and it will be recognized that a good vacuumtight mechanical securance to the bore 16 is achievable, particularly since there is essentially no different radial thermal expansion of the tube 16 end and cylinder 42 over to the temperature range to which the securance joint is subjected during normal usage of the laser.

The anode itself is cylindrical and is generally referred to by the reference numeral 43. It is made of OFHC copper for high electrical and thermal conductivity and good vacuum compatibility. In accordance with the invention, it is directly adhered to the ceramic of the tube (to the ceramic cylinder 42) without special steps being taken to accommodate differential thermal expansion between such electrode and the ceramic. In this connection, it will be recognized that there is significant differential thermal expansion between a metal and a ceramic. The securance is achieved with a vacuum-tight seal over a large surface area. To this end, the electrode 43 has an outer cylindrical surface 44 whose axial dimension is greater than its radial dimension a portion of which mates with and is brazed to the interior surface 46 of the ceramic cylinder 42. As an example, in one embodiment the anode itself had a 0.373 inch diameter and a length of 1.38 inches. Approximately 70% of the exterior surface of the anode itself was adhered by brazing to the interior surface of the cap 43. The surfaces 44 and 46 are plated respectively with silver and molybdenum manganese plus nickel prior to the anode being assembled within the cylinder 42. The diameter of the anode is slightly less than the diameter of the interior surface 46 of such cylinder. The result is that these parts easily can be mechanically assembled together. They are then raised to the brazing temperature. The coefficient of thermal expansion of OFHC copper, the preferred material for anode 43, is $20.1 \times 10^{-6}$ in/in/° C. whereas the coefficient of thermal expansion of BeO, the preferred material for cylinder 42, is $8.5 \times 10^{-6}$ in/in/° C. This fact is used in the instant invention to enhance the adherence of the anode to the tube. That is, upon these parts being raised to the brazing temperature, the thermal expansion of the metal anode 43 in the radial dimension will be greater than the thermal expansion of the cylinder. There therefore is a tight mechanical fit during brazing. This assures that a thin braze which provides a good thermal path between the anode and cylinder, is achieved. The silver plated copper forms a copper/silver utectic which flows at 800° C. and forms the necessary braze alloy to make the joint. Due to the extreme ductility of OFHC copper at the braze temperature, the tensile forces on the ceramic do not break it.

It will be recognized that when the assembly is returned to ambient temperature, the radial dimension of the anode 43 will tend to shrink to a greater extent than the radial dimension of the interior surface of the cylinder 42. The result is that some stress will be built up between the parts 42 and 43. However, this stress is spread over a significant surface area in view of the fact that the braze covers a relatively large surface area, and the joint and structures can accommodate the same.

The configuration of the electrode relative to the cylinder 42 also aids in achieving the desired adherence. It has a radially thick first portion 47 which includes an axial passageway for the passage therethrough of optical radiation, and a radially thin second portion which, in effect, defines a thin-walled sleeve 48. The surface 44 of the anode which is adhered to the surface 46 of the end cap is provided as illustrated by both the portions 47 and 48. As mentioned previously, the dimensional change in a metal due to thermal variations is significantly greater than that of a ceramic. The coefficient of thermal expansion of a material is a measure of such change.

The electrode configuration is selected to enhance laser operation. That is, the portion of the same at which significant thermal energy is generated, i.e., its first portion, is radially thick for good thermal conductivity. The free end of the thick-walled portion is conical in shape to increase its surface area for distribution of the discharge. The thin-walled sleeve 48 integral therewith allows desired electrical conductivity, but minimizes thermal conductivity from the discharge because of its thinness. In other words, the configuration of the anode provides good thermal conductivity in the radial direction but not in the axial direction. The fact that the thin-walled sleeve is an integral part of the anode, i.e., the anode is a one-piece construction, assures good electrical conductivity.

As another salient feature of the instant invention, the configuration of the anode structure eliminates the need for electrical feedthroughs. The anode 43 has surfaces exposed both to the interior and exterior of the tube so that an electrical potential can be provided to the interior of the tube without penetration by leads. The thin-walled sleeved portion 48 of the anode 43 extends outwardly beyond the cylinder 42 thereby to have an exposed exterior surface. An electrically conductive connection in the form of a clamp 49 is provided circumscribing the sleeve portion to provide the required electrical potential.

It will be recognized that to assure good electrical connection the clamp 49 should mate closely with the sleeve portion 48. This can be achieved by clamping the same tightly to the sleeve. Such clamping, though, will result in force being applied to the sleeve tending to collapse the same. The ceramic end tubing of the window structure resists any such force and prevents the sleeve from collapsing. That is, as is illustrated the ceramic end tubing is located coaxially within the sleeve. The interior surface of the sleeve mates with the exterior surface of the ceramic end tubing. A ceramic is extremely strong in compression and less ductile than a metal, such as copper, which an anode typically will be made from. The result is that the end tubing 39 will mechanically support the thin-walled portion of the anode and resist any force provided by the clamp tending to constrict or distort such portion. Thus the ceramic end tubing of the window structure cooperates with the configuration of the anode structure.

The end tubing 39 is also brazed to the anode structure. This braze can be made relatively conventionally, by placing a ring of brazing material at the interface between the end of the tubing and the interior surface of the thin-walled sleeve portion. When the assembly then is raised to a brazing temperature, the brazing metal will flow into the interface and provide a good, vacuum tight seal thereat. Thus, a classic "sandwich" seal is formed between the ceramic, copper and aluminum oxide, a seal well known to be strong and tight.

It will be recognized from the above that the configuration of the anode structure permits simple one-step brazing assembly. That is, the braze between the tube 39 and the anode 43 can be achieved at the very same time as the braze between the surfaces 44 and 46.

While the invention has been described in connection with a preferred embodiment thereof, it will be appreciated by those skilled in the art that various changes and modifications can be made without departing from its spirit. It therefore is intended that the coverage afforded applicant be limited only by the claims and their equivalents.

We claim:

1. In a laser tube defining a containment volume for a lasable medium;

window structures at opposite ends of said tube to permit escape from said tube of optical radiation resulting from lasing action;

and means for exciting said lasable medium, said means including at least one electrically conductive electrode adhered by brazing directly to ceramic of said tube without accommodation for differential thermal expansion between said electrode and said ceramic.

2. The laser tube of claim 1 wherein said tube is ceramic adjacent its end at which said electrode is to be located and said ceramic tube has an interior surface thereat which is cylindrical for reception of said electrode, and said electrode has an outer cylindrical surface whose axial dimension is greater than its radial dimension, the interior surface of said ceramic tube and exterior surface of said electrode, the interior surface of said ceramic tube and exterior surface of said electrode, respectively have metal layers thereon which are brazed together to provide said direct adherence.

3. The laser tube of claim 1 wherein said electrode is an anode.

4. The laser tube of claim 1 wherein said electrode is an elongated cylindrical body of electrically conductive material having a radially thick first portion and a radially thin second portion defining a thin-walled sleeve; and a ceramic end tubing of a window structure is located coaxially within said second portion of said electrode with the interior surface of said second portion mating with the exterior surface of said ceramic end tubing.

5. The laser tub of claim 4 wherein the exterior surface of said second portion of said electrode is exposed to the exterior of the containment volume for said lasable medium whereby electrical connection to said anode surface provides electrical potential within the interior of said laser tube.

6. The laser tube of claim 5 wherein a vacuum seal isolating for the interior of said laser tube from the atmosphere is provided between said radially thin second portion of said electrode and said ceramic end tubing of a window structure, and said direct adherence of said electrode to said ceramic of said tube provides a vacuum seal thereat.

7. A laser tube of claim 4 wherein said electrode defines a portion of the containment volume for said lasable medium and an electrically conductive connection is provided clamping said thin-walled sleeve portion with force tending to constrict or distort said thin-walled sleeve portion resisted by said ceramic end tubing.

8. The laser tube of claim 6 further including a ceramic envelope for containing an electrical discharge in said lasable medium, and wherein said electrode is an anode at one end of said envelope and said means for selectively maintaining lasing action in said lasable medium includes a cathode at an opposite end of said envelope.

9. In a laser tube defining a containment volume for a lasable medium;

window structures at opposite ends of said tube to permit escape from said tube of optical radiation resulting from lasing action;

and means for exciting said lasable medium, said means including at least one electrically conductive electrode defining a portion of the containment volume for the lasable medium and said electrode having surfaces exposed both to the interior of said tube and to the exterior thereof, and a conductive electrical connection is provided to the exterior surface thereof whereby an electrical potential can be provided to the interior of said containment volume without penetration thereinto for leads for said electrically conductive electrode.

10. A laser tube according to claim 9 wherein said electrode is an elongated cylindrical body of electrically conductive material having a radially thick first portion and a radially thin second portion said radially thin second portion defining a thin-walled sleeve; and a ceramic end tubing of a window structure is located coaxially within said second portion of said electrode with the interior surface of said second portion mating with the exterior surface of said ceramic end tubing.

11. A laser tube according to claim 10 wherein said electrode defines a portion of the containment volume for said lasable medium and an electrically conductive connection is provided clamping said thin-walled sleeve portion with force tending to constrict or distort said thin-walled sleeve portion resisted by said ceramic end tubing.

12. A laser comprising a pair of mounts for respectively positioning optical reflectors in a selected, rigid and spaced-apart relationship to define an optical cavity having an optical axis therebetween;

a laser tube positioned on said optical axis defining a containment volume for a lasable medium and having a ceramic envelope for containing an electrical discharge in said medium, window structure positioned on said optical axis at opposite ends of said tube to permit escape from said tube of optical radiation resulting from lasing action in said tube, means for exciting said lasable medium, said means include a cathode positioned at one end of said laser tube and an anode positioned at the other end thereof, said anode defining a portion of the containment volume for said lasable medium and having at least a pair of surfaces one of which is exposed to the interior of said envelope and the other of which is exposed to the exterior thereof whereby said anode conducts electrical potential directly from the exterior of said tube to the interior thereof and is adhered directly to said tube by brazing without accommodation for differential thermal expansion and a power supply is connected to said cathode and anode to supply the necessary potential to said tube to maintain said lasing action.

13. In method of manufacturing a laser tube, the steps comprising:

providing a ceramic tube to enclose a gaseous lasable medium along an optical axis of a laser, the interior surface of said tube being cylindrical at one end;

providing an electrode to for exciting said lasable medium within said tube, said electrode having a cylindrical outer surface whose axial dimension is greater than its radial dimensions; and directly adhering said surface of said electrode to said interior surface of said tube including adhering an axial portion of said surface of said electrode which is greater than the radial dimension of said electrode.

14. The method of claim 13 wherein said surfaces are directly adhered to one another by brazing the same together.

15. The method of claim 14 wherein step of adhering includes the step of plating both the interior surface of said tube and said outer surface of said electrode with brazing metals, mechanically fitting said electrode within said ceramic end to mate said surfaces and thereafter raising the said interior surface of said tube and said outer surface of said electrode to a brazing temperature for said metals.

16. The method of claim 14 wherein the electrode which is provided is an elongated cylindrical body of electrically conductive material having a radially thick first portion defining a bore for passage of optical radiation and a radially thin second portion defining a thinwalled sleeve, and further including the steps of:

providing a window structure having a ceramic end tubing fittable within said second portion of said electrode with the interior surface of said second portion mating with the interior surface of said ceramic end tubing; and adhering together mating surfaces of said ceramic end tubing and said electrode thinwalled sleeve.

* * * * *